(12) United States Patent
Treat

(10) Patent No.: US 7,306,358 B2
(45) Date of Patent: Dec. 11, 2007

(54) SWING ARM TAILLIGHT ASSEMBLY FOR A MOTORCYCLE

(76) Inventor: Troy R. Treat, 68987 M-62, Edwardsburg, MI (US) 49112

( * ) Notice: Subject to any disclaimer, the term of this patent is extended or adjusted under 35 U.S.C. 154(b) by 37 days.

(21) Appl. No.: 11/344,588

(22) Filed: Jan. 31, 2006

(65) Prior Publication Data

US 2007/0177396 A1     Aug. 2, 2007

(51) Int. Cl.
*F21V 7/04* (2006.01)

(52) U.S. Cl. ................. 362/633; 362/473; 362/546; 362/549

(58) Field of Classification Search ........... 362/633, 362/473, 546, 549; D26/28
See application file for complete search history.

(56) References Cited

U.S. PATENT DOCUMENTS 5,964,312 A * 10/1999 Maldonado ................. 180/227

* cited by examiner

*Primary Examiner*—Sandra O'Shea
*Assistant Examiner*—Mark Tsidulko
(74) *Attorney, Agent, or Firm*—R. Tracy Crump

(57) ABSTRACT

The taillight assembly is mountable to a swing arm of a rear suspension motorcycle frame and includes a tubular cover housing and an LED lamp disposed within the cover housing. The LED lamp is electrically wired to the motorcycles electrical system by wires that are run internally through the cover housing and swing arm. The LED lamp uses a plurality of individual light emitting diodes (LEDs), which convert electric energy into electromagnetic radiation (light). The LED lamp is configured so that one portion of the LEDs emit a red light and another portion emit a white light.

4 Claims, 4 Drawing Sheets

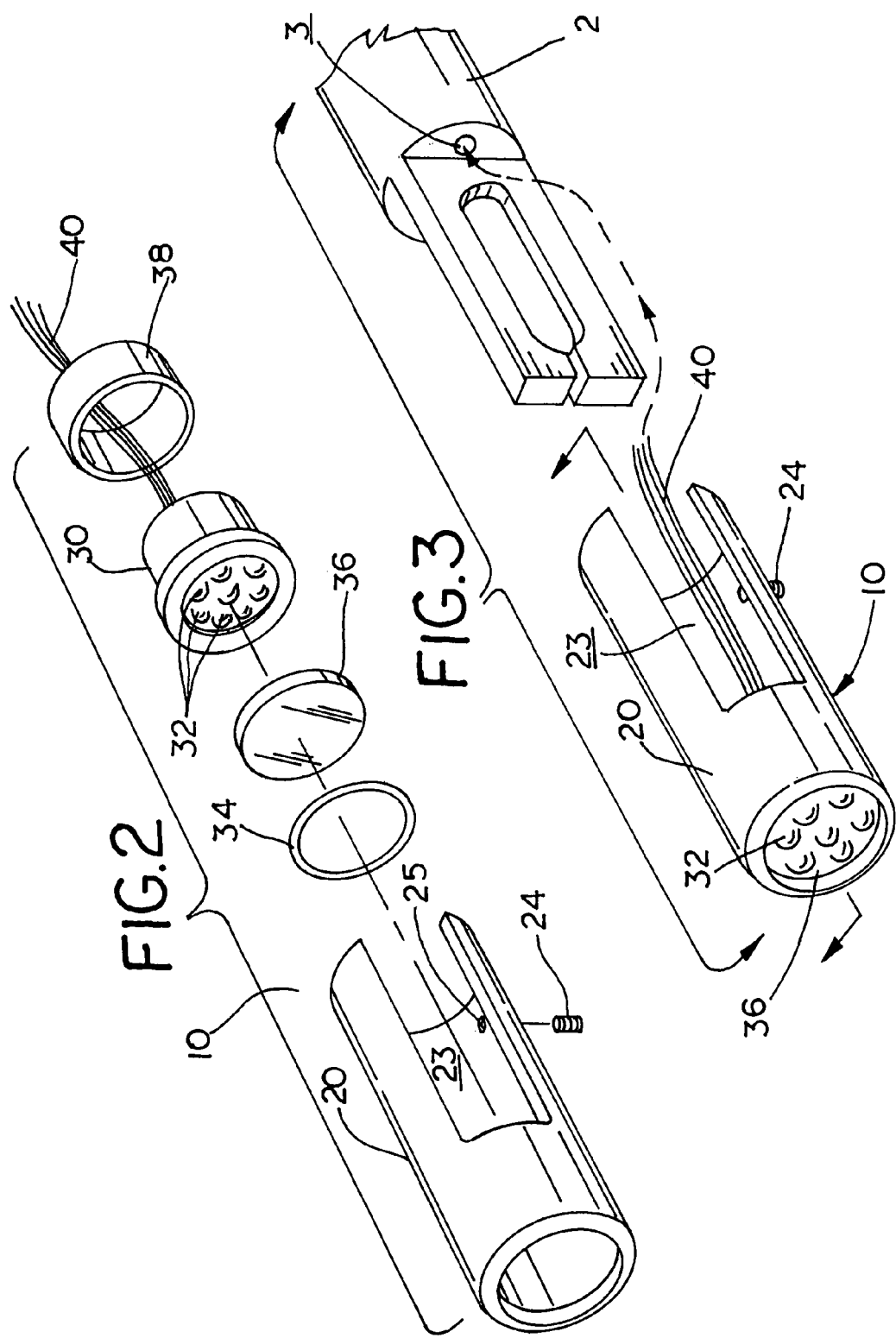

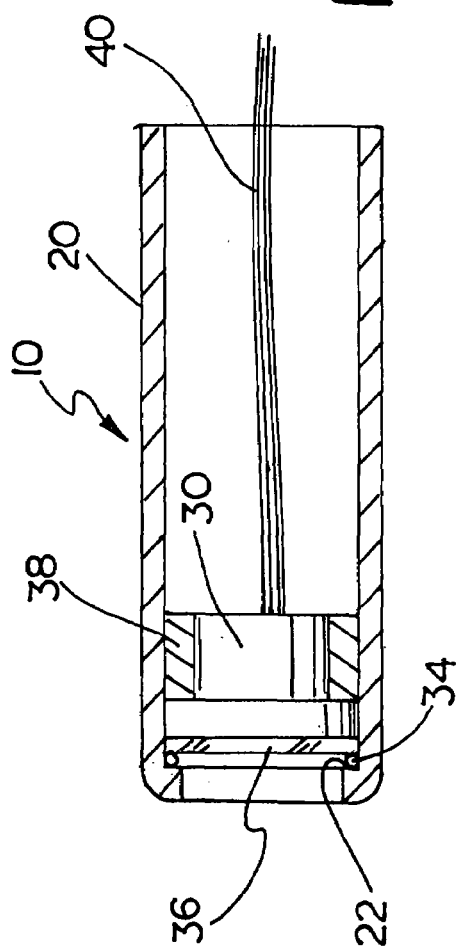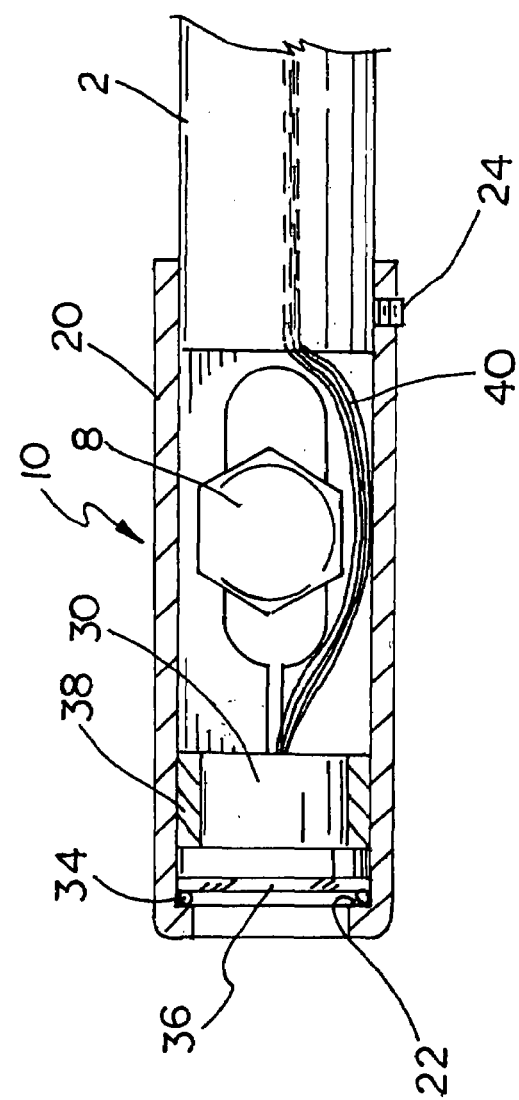

SWING ARM TAILLIGHT ASSEMBLY FOR A MOTORCYCLE

This invention relates to a taillight assembly for motorcycles and in particular a taillight assembly mountable to the swing arm of a motorcycle.

BACKGROUND OF THE INVENTION

Motorcycle taillights and turn lights are typically external components mounted to the frames or fenders. For aesthetic purposes, it is often desirable to eliminate protruding lights and integrate them into the contour and shape of the frame, fender or other structure to maintain the lines and appearance of the motorcycles. While conventional light assemblies have been incorporated into the design of rigid framed motorcycles, conventional lights heretofore have not been incorporated into the swing arms of rear suspension motorcycle frames. Rear suspension motorcycle frames include a rear swing arm pivotally mounted to the main frame structure. The filaments of conventional light assemblies are quickly damaged by vibrations and violent movements of a swing arm during normal road conditions. Consequently, taillights and turn lights must be mounted to the rear fenders or some other rigid structure on rear suspension motorcycles, which often detracts from the appearance of the motorcycle.

SUMMARY OF THE INVENTION

The taillight assembly embodying the present invention is mountable to a swing arm of a rear suspension motorcycle frame. The taillight assembly combines the taillight functions with a swing arm axle cover. The taillight assembly is axially mounted to the end of the swing arm and covers the axle nuts, which secure the rear wheel to the swing arm. The taillight assembly includes a tubular cover housing and an LED lamp disposed within the cover housing. The LED lamp is electrically wired to the motorcycles electrical system by wires that are run internally through the cover housing and swing arm. The LED lamp uses a plurality of individual light emitting diodes (LEDs), which convert electric energy into electromagnetic radiation (light). The LED lamp is configured so that one portion of the LEDs emit a red light and another portion emit a white light.

The use of LEDs in the lamp allows taillights to be mounted directly to the swing arm of the rear suspension motorcycle frame. The LED lamp does not have a filament which may be damaged by the vibrations or violent movements of the swing arm. The ligh assembly also provides a clean aesthetic appearance. The light assembly covers the axle bolts and conforms to the contour of the swing arm, while eliminating the need to externally mount taillights to the frame, fenders or other structures of the motorcycle.

Theses and other advantages of the present invention will become apparent from the following description of an embodiment of the invention with reference to the accompanying drawings.

BRIEF DESCRIPTION OF THE DRAWINGS

The drawings illustrate an embodiment of the present invention, in which:

FIG. 2 is an exploded perspective view of the taillight assembly of FIG. 1;

FIG. 3 is an partial exploded view of the swing arm taillight assembly of FIG. 1 and the end of a swing arm illustrating the connection between the taillight assembly and the swing arm;

FIG. 4 is a side sectional view of the swing arm light assembly of FIG. 1;

FIG. 5 is a side sectional view of the swing arm light assembly mounted to the swing arm of FIG. 1.

DESCRIPTION OF THE PREFERRED EMBODIMENT

Figure 1:
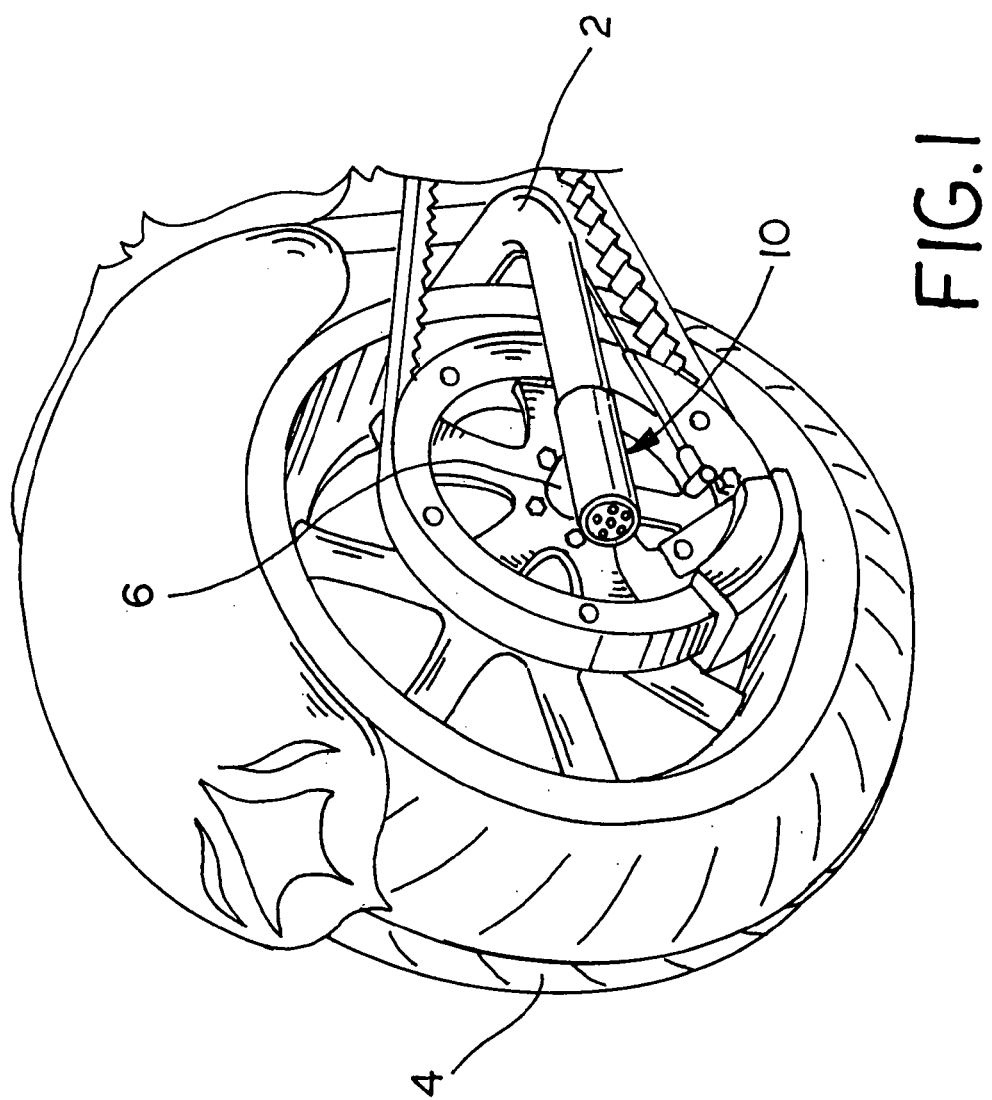
FIG. 1 is partial perspective view of the rear portion of a motorcycle showing one embodiment of the swing arm light assembly of this invention.
Figure 6:
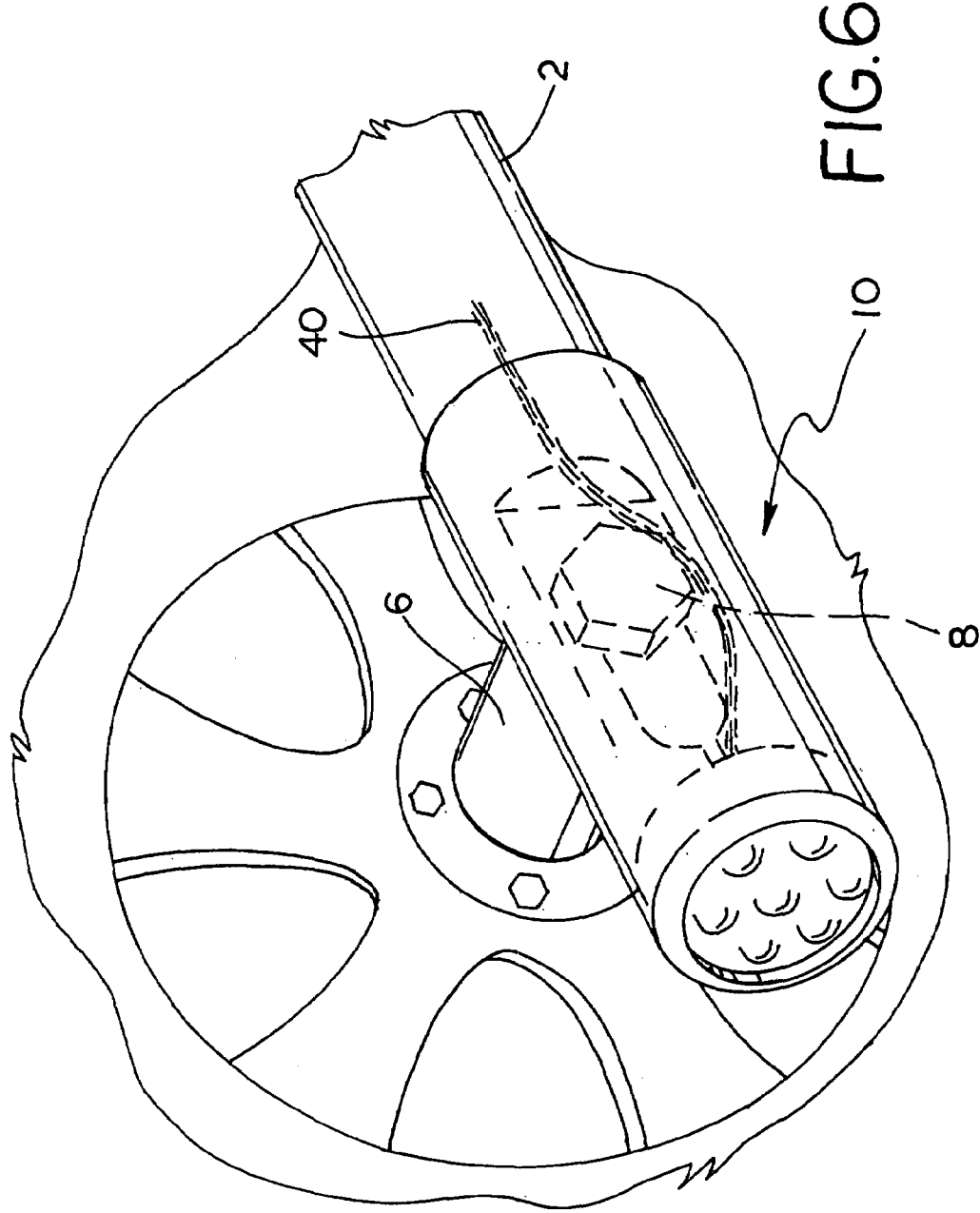
FIG. 6 is another partial perspective view of the swing arm and swing arm light assembly of FIG. 1 with a portion cut away to show the interior of the light assembly.

Referring now to the drawings, reference numeral 10 generally designates an embodiment of the swing arm taillight assembly of this invention. Taillight assembly 10 is designed for use on the swing arms of rear suspension motorcycle frames. FIG. 1 shows a the rear portion of a typical rear suspension motorcycle. As shown, the motorcycle frame includes a round tubular swing arm 2 and a rear wheel 4 bolted to the swing arm by an axle bolt 8. The axle bolt 8 extends through a slot 3 in swing arm 2 and turns into the rear axle hub 6 of rear wheel 4. As shown in FIGS. 1, 3, 5, and 6, taillight assembly 10 is axially mounted over the end of the swing arm 4 and covers the axle nuts, which secures rear wheel 4 to the swing arm.

As best shown in FIG. 2, taillight assembly 10 includes a tubular cover housing 20. Ideally, cover housing 20 is constructed of a metal, which can be polished, plated or painted, such as steel or aluminum, but may also be molded or formed from a plastic for similar appearances. As shown, cover housing 20 has a round cross section shaped to match the round cross sectional shape and general configuration of swing arm 2. While a round housing is shown, the housing may have any cross sectional shape (square, rectangular, oval, etc . . . ) to accommodate the cross sectional shape and general configuration of the swing arm. Cover housing 20 has two open ends and a longitudinal slot 23 extending inward from the swing arm end. Axle bolt 8 is received within slot 23, which allows cover housing 20 to be inserted over the end of swing arm 2 and cover the axle bolt. The lamp end of cover housing 20 has a rolled edge to form an internal shoulder 24.

An LED lamp 30 is disposed within the lamp end of housing 20 and secured in place by a tubular collar or spacer 38, which is bonded within the housing by an epoxy or other suitable fastening method. LED lamp 30 is of conventional design and includes a plurality of light emitting diodes (LEDs) 32 electrically connected in parallel and mounted to a small circuit board (not shown), which is enclosed in a cylindrical plastic cup. LEDs 32 are rectifying semiconductors that convert electric energy into electromagnetic radiation (light). Ideally, LEDs 32 are a gallium arsenide LED, which produces a high efficiency light comparable to small incandescent lamps and can emit light of varying colors. LED lamp 30 are configured so that one portion of the LEDs 32 emit a red light and another portion emit a white light for use as both red brake, tail and turn lights and white backing lights.

As shown in FIGS. 2, 4 and 5, an O-ring 34 and a flat transparent lens 36 are interposed between shoulder 24 of cover housing 20 and LED lamp 30. O-ring 34 and lens 36 encloses the open end of cover housing 20, which protects LED lamp 30 from moisture and road debris. O-ring 34 and spacer 38 also help isolate LED lamp 30 from vibrations. Cover housing 20 is secured to swing arm 2 by a small fastener 24, which is turned into a threaded bore in the cover housing to engage the swing arm.

As shown in FIGS. 3-6, LED lamp 30 is powered and operated by the motorcycles electrical system. Electrical wires 40 extending from LED lamp 30 connect the LED lamp to the electrical system of the motorcycle. Electrical wires 40 are run internally through cover housing 20 and swing arm 2, with the wires are fed into the swing arm through a small bore 3. Ideally the edges of bore 3 are covered by a protective eyelet to prevent damage to electrical wires 40.

One skilled in the art will appreciate that this invention combines tail lights with a swing arm axle cover. The use of LEDs in the lamp allows taillights to be mounted directly to the swing arm of the rear suspension motorcycle frame. Because LEDs are solid state components, the LED lamp does not have a filament which may be damaged by the vibrations or violent movement of the swing arm. Incorporating the taillights into the swing arm, eliminates the need to externally mount the lights to the frame, fenders or other structures. The light assembly also provides a clean aesthetic appearance. The light assembly covers the axle bolts and the end of the swing arm. The light assembly also allows the electrical wiring to be fully enclosed with the housing of the light assembly and the swing arm itself.

The embodiment of the present invention herein described and illustrated is not intended to be exhaustive or to limit the invention to the precise form disclosed. It is presented to explain the invention so that others skilled in the art might utilize its teachings. The embodiment of the present invention may be modified within the scope of the following claims.

I claim:

1. A taillight assembly for a motorcycling where the motorcycle includes a rear wheel axle mounted to a round tubular swing arm by an axle nut, the taillight assembly comprising:
    a round tubular housing having an open first end and an open second end which is dimensioned to be fitted axially over the swing arm and cover the axle nut, the housing also having a longitudinal slot extending from the open second end through which the rear wheel axle extends when the assembly is fitted to the swing arm;
    an LED lamp enclosed within the housing at the first end thereof; and
    wires disposed within the housing for connecting the light emitting diode lamp to the electrical power source through the swing arm.

2. The taillight assembly of claim 1 wherein the LED lamp includes a first light emitting diode for emitting red light and a second light emitting diode for emitting white light.

3. The taillight assembly of claim 1 and a o-ring disposed within the housing and against the LED lamp to isolate the LED lamp from vibrations.

4. The taillight assembly of claim 3 wherein the housing first end having an internal shoulder, the o-ring seated against the shoulder.

\* \* \* \* \*